(12) United States Patent
Leister et al.

(10) Patent No.: US 8,845,790 B2
(45) Date of Patent: Sep. 30, 2014

(54) METHOD AND SYSTEM FOR REMOVAL OF GASEOUS CONTAMINANTS

(75) Inventors: Jonathan W. Leister, Manvel, TX (US); Barath Baburao, Knoxville, TN (US); Frederic Vitse, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 50 days.

(21) Appl. No.: 13/238,534

(22) Filed: Sep. 21, 2011

(65) Prior Publication Data

US 2012/0174783 A1 Jul. 12, 2012

Related U.S. Application Data

(60) Provisional application No. 61/430,280, filed on Jan. 6, 2011.

(51) Int. Cl.
*B01D 53/14* (2006.01)

(52) U.S. Cl.
CPC ........ *B01D 53/1425* (2013.01); *B01D 2259/65* (2013.01); *B01D 2257/308* (2013.01); *B01D 2252/20421* (2013.01); *B01D 2258/0283* (2013.01); *B01D 2252/20426* (2013.01); *B01D 2257/304* (2013.01); *B01D 2257/504* (2013.01)
USPC ................... 95/178; 95/179; 95/180; 95/193; 95/199; 95/209; 95/211; 95/227; 95/228; 96/242

(58) Field of Classification Search
USPC ........... 95/227, 178, 179, 180, 193, 194, 209, 95/228; 202/262, 270; 203/DIG. 9; 96/242
See application file for complete search history.

(56) References Cited

U.S. PATENT DOCUMENTS

| 4,152,217 | A | 5/1979 | Eisenberg et al. | |
|---|---|---|---|---|
| 5,133,793 | A * | 7/1992 | Billy | 62/630 |
| 2007/0283813 | A1* | 12/2007 | Iijima et al. | 96/235 |
| 2008/0184887 | A1 | 8/2008 | Mak | |
| 2009/0101012 | A1* | 4/2009 | Gal et al. | 95/225 |
| 2009/0158930 | A1* | 6/2009 | Wagner et al. | 95/179 |
| 2010/0242731 | A1 | 9/2010 | Baburao | |
| 2011/0120309 | A1 | 5/2011 | Baburao | |

FOREIGN PATENT DOCUMENTS

| EP | 0 588 175 | 3/1994 |
|---|---|---|
| EP | 1 736 231 | 12/2006 |

OTHER PUBLICATIONS

The International Search Report and the Written Opinion of the International Searching Authority for PCT/US2011/063646, dated Mar. 14, 2012.

\* cited by examiner

*Primary Examiner* — Duane Smith
*Assistant Examiner* — Cabrena Holecek
(74) *Attorney, Agent, or Firm* — Cynthia W. Flanigan

(57) ABSTRACT

A method and system for removing gaseous contaminants from a gas stream by contacting the gas stream with a wash solution and regenerating the wash solution in a regeneration system for future use in removing gaseous contaminants from the gas stream.

29 Claims, 3 Drawing Sheets

METHOD AND SYSTEM FOR REMOVAL OF GASEOUS CONTAMINANTS

CROSS-REFERENCE TO RELATED APPLICATIONS

This application claims priority to U.S. Provisional Patent Application Ser. No. 61/430,280, filed Jan. 6, 2011, the disclosure of which, to the extent not inconsistent herewith, is incorporated by reference herein in its entirety.

BACKGROUND

1. Field of the Invention

The disclosed subject matter relates to methods and systems for removal of gaseous contaminants from gas streams.

2. Description of Related Art

In conventional industrial technologies for gas purification, impurities, such as $H_2S$, $CO_2$ and/or COS are removed from a gas stream such as flue gas, natural gas, syngas or other gas streams by absorption in a liquid wash solution, e.g., in a liquid solution comprising an amine compound.

Used wash solution is subsequently regenerated in a regenerator column (also referred to as a "regenerator") to release the impurities present in the solution, typically by counter-current contact with steam. The steam needed for regeneration is typically produced by boiling the regenerated wash solution in a reboiler that is, located near the bottom portion of the regenerator column. In addition, the reboiling of the regenerated wash solution may provide further release of impurities present in the wash solution.

In conventional absorption-regeneration processes as described above, regenerated and reboiled wash solution is typically re-used in another absorption cycle. However, the reboiled solution may have a temperature as high as 100-150° C. To enable efficient absorption, wash solutions based on amine compounds are typically cooled before being passed to another round of absorption. Cooling has conventionally been accomplished by heat-exchange with used wash solution from the absorption process.

The energy produced by the reboiler is not only used for regeneration, but also at other locations in an absorption-regeneration process. In general, the energy requirements of a conventional gas purification process are of three types: binding energy, stripping energy and sensible heat. Binding energy is required for breaking the chemical bond formed between the impurities and the wash solution, whereas stripping energy is required for production of the steam needed for releasing the impurities from the wash solution. Sensible heat is in turn needed for heating of the wash solution prior to regeneration. In conventional systems and processes, part of the produced energy may be lost for example, in the system coolers, which reduce the temperature at specified locations in the system, e.g., the cooler located near the absorber inlet for cooling return wash solution before feeding it to the absorber. Moreover, energy may be lost in condensers located at the top of the absorber, regenerator etc., and in the form of water vapor exiting the process, mostly at the top of the regenerator where water vapor is present in the purified $CO_2$ gas.

Thus, contaminant removal from gas streams, and in particular the regeneration of wash solutions, is an energy intensive process. Reduction of energy requirements at different parts of a gas purification process could potentially reduce the total energy required by the system.

SUMMARY

According to aspects illustrated herein, there is provided a system for regenerating a wash solution utilized to remove gaseous contaminants from a gas stream, the system comprising: a first heat exchanger for heat transfer between a hot regenerated wash solution and a used wash solution to form a first heated used wash solution; a second heat exchanger for heat transfer between the hot regenerated wash solution and at least a portion of the used wash solution from the first heat exchanger to form a second heated used wash solution; and a regenerator arranged to receive the used wash solution, the first heated used wash solution and the second heated used wash solution, wherein the second heated used wash solution has a temperature greater than the first heated used wash solution and the first heated used wash solution has a temperature greater than the used wash solution.

According to another aspect illustrated herein, there is provided a process for regenerating a wash solution utilized in removing gaseous contaminants from a gas stream, the process comprising: providing a first portion of a used wash solution to a regenerator; providing a second portion of the used wash solution to a first heat exchanger to transfer heat between a hot regenerated wash solution and the second portion of the used wash solution to form a first heated used wash solution; providing a first portion of the first heated used wash solution to a regenerator; providing a second portion of the first heated used wash solution to a second heat exchanger for heat transfer between the hot regenerated wash solution and the first heated used wash solution to form a second heated used wash solution; and providing the second heated used wash solution to the regenerator, wherein the second heated used wash solution provided to the regenerator has a temperature greater than a temperature of the first heated used wash solution provided to the regenerator and the first heated used wash solution provided to the regenerator has a temperature greater than a temperature of the used wash solution provided to the regenerator.

According to other aspects illustrated herein, there is provided a method of reducing an amount of energy consumed by a regenerator, the method comprising: separating a used wash solution into a plurality of portions; providing a first portion of the used wash solution to a regenerator, the used wash solution having a first temperature (T1); heating a second portion of the used wash solution to form a first heated used wash solution having a second temperature (T2); heating a third portion of the used wash solution to form a second heated used wash solution having a third temperature (T3); and providing the first and second heated used wash solutions to the regenerator, wherein a temperature distribution of T1<T2<T3 is maintained, thereby reducing an amount of energy consumed by the regenerator.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION

Figure 1:
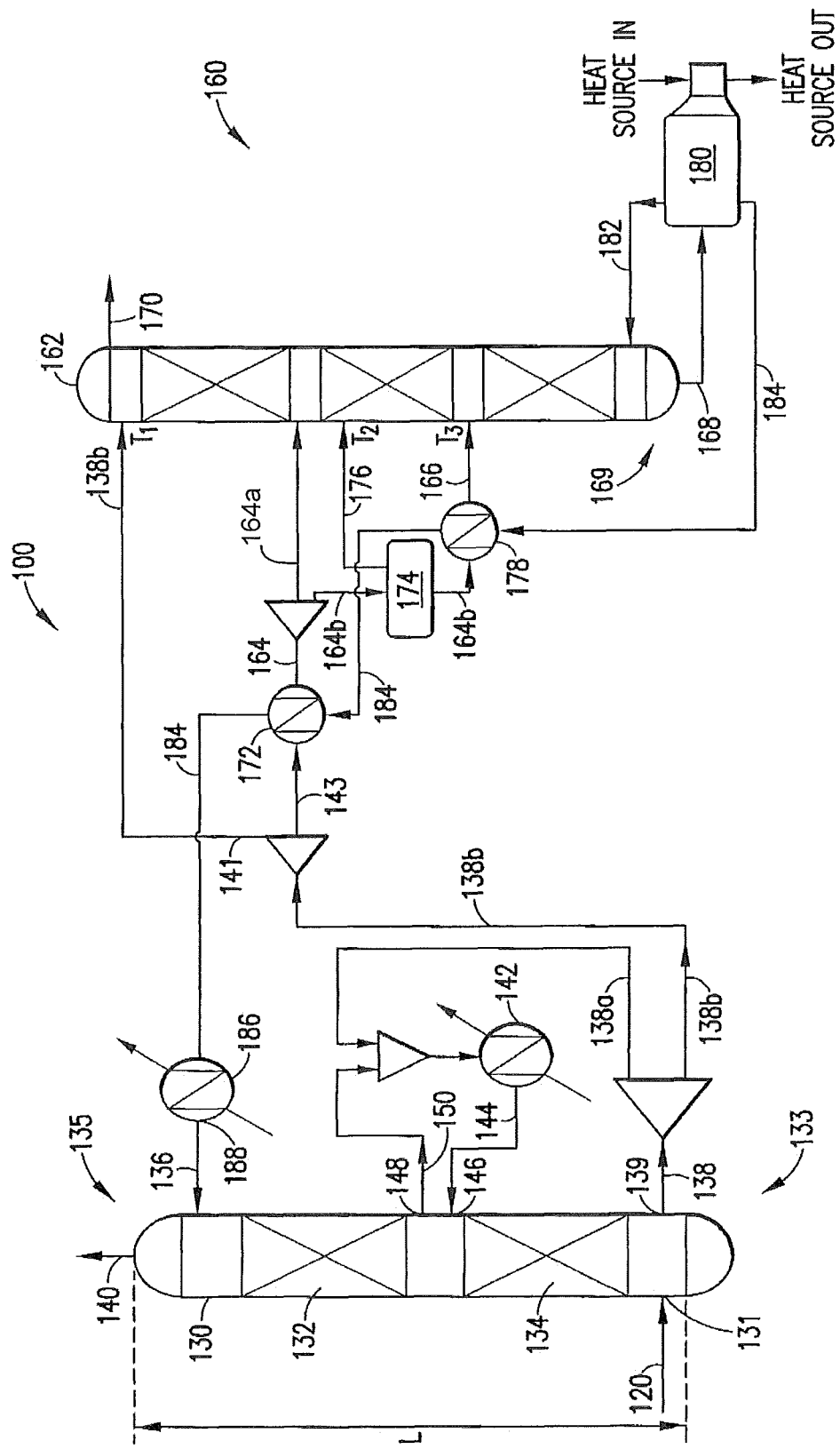
FIG. 1 is a schematic representation of a system for removing gaseous contaminants from a gas stream.

FIG. 1 shows a system 100 for removing gaseous contaminants from a gas stream 120. Gas stream 120 may be any stream of gas that includes gaseous contaminants, and includes, but is not limited to a flue gas stream from a combustion source, a natural gas stream, a syngas, and the like. The gaseous contaminants present in the gas stream 120 include, but are not limited to, acid gas impurities such as $CO_2$, $H_2S$, and the like.

Gas stream 120 is introduced to an absorber 130, which is arranged to allow contact between the gas stream and a wash solution. In one embodiment, the absorber 130 is a packed bed column. The packed bed column may have multiple sections of the same, or different packing material. As shown in FIG. 1, the absorber 130 includes two (2) absorption sections, an upper absorption section 132 and a bottom absorption section 134. The absorber 130 is not limited in this regard as more or less absorption sections may be present in the absorber.

Gas stream 120 containing gaseous contaminants enters the absorber 130 at an entry point 131 and travels up a length L of the absorber. As shown in FIG. 1, the entry point 131 is located at a bottom portion 133 of the absorber 130. As the gas stream 120 travels up the length L of the absorber 130 it is contacted with a wash solution in the absorption sections 132, 134. The wash solution typically travels down the length L of the absorber 130 such that it is in countercurrent contact with the gas stream 120.

In one embodiment, the wash solution is an amine-based wash solution. Examples of amine-based wash solutions include, but are not limited to, amine compounds such as monoethanolamine (MEA), diethanolamine (DEA), methyldiethanolamine (MDEA), diisopropylamine (DIPA) and aminoethoxyethanol (diglycolamine). The most commonly used amine compound in industrial plants are the alkanolamines MEA, DEA, MDEA and some blends of conventional amines with promoters, inhibitors, and the like. The amine-based wash solution may also include a promoter to enhance the chemical reaction kinetics involved in the capture of CO2 by the ammoniated solution. For example, the promoter may include an amine (e.g. piperazine) or an enzyme (e.g., carbonic anhydrase or its analogs), which may be in the form of a solution or immobilized on a solid or semi-solid surface. However, it is understood that the systems and processes as disclosed herein may be applied to any solution involved in a process with an absorption/regeneration scheme.

At least a portion of the wash solution is introduced to the absorber 130 at a top portion 135 of the absorber via a line 136 and travels down the length L of the absorber where it contacts the gas stream 120 in the absorption sections 132, 134.

In the absorber 130, gaseous contaminants, such as carbon dioxide ($CO_2$), present in the gas stream 120 are absorbed by the wash solution, thereby forming a used wash solution 138 and a reduced contaminant gas stream 140. The used wash solution 138 is rich in contaminants absorbed from the gas stream 120.

As shown in FIG. 1, the reduced contaminant gas stream 140 is released from the top portion 135 of the absorber 130. The reduced contaminant gas stream 140 may undergo further processing (not shown) prior to being sent to a stack for release to an environment. Further processing, of the reduced contaminant gas stream 140 may include, e.g., particulate removal.

At least a portion of the used wash solution 138 is withdrawn and leaves the absorber 130 at a first withdrawal level 139. FIG. 1 illustrates the first withdrawal level 139 in the bottom portion 133 of the absorber 130, i.e., downstream of the bottom absorption section 134 with respect to the flow of the wash solution. However, it is contemplated that the first withdrawal level may be located at any position on the absorber 130.

The used wash solution 138 that is withdrawn at the first withdrawal level 139 may be regenerated in a regenerator, where the contaminants are separated from the used wash solution in order to produce a regenerated wash solution for re-use in the absorber 130.

Still referring to FIG. 1, after leaving the absorber 130 at the first withdrawal level 139, the used wash solution 138 is separated into two portions, a first portion 138a and a second portion 138b. In one embodiment, the used wash solution 138 is separated into two equal portions, e.g., 50% of the used wash solution 138 forms first portion 138a, while 50% of the used wash solution 138 forms second portion 138b. However, it is contemplated that in other embodiments the used wash solution 138 is separated into two unequal portions, e.g., 10% of the used wash solution 138 forms the first portion 138a while 90% of the used wash solution forms second portion 138b. In a particular embodiment, 30-60% of the used wash solution 138 forms the first portion 138a, with the remainder of the used wash solution forming the second portion 138b.

The first portion of the used wash solution 138a is provided to a cooling unit 142 that is in fluid communication with the absorber 130. In the cooling unit 142, the temperature of used wash solution 138a is reduced and the used wash solution 138a returned to the absorber 130 as a cooled used wash solution 144. The cooled used wash solution 144 is returned to the absorber 130 at a first reintroduction level 146. The first reintroduction level 146 of the cooled used wash solution 144 is located upstream from the first withdrawal level 139, with respect to the flow of the wash solution in the absorber 130.

As shown in FIG. 1, the absorber 130 has a second withdrawal level 148 that is located at a position downstream of the upper absorption section 132 and upstream of the first reintroduction level 146 with respect to the flow of the wash solution in the absorber 130. A used wash solution 150 that is partially saturated with contaminants absorbed from the gas stream 120 is withdrawn from the absorber 130 at the second withdrawal level 148 and is provided to the cooling unit 142. The used wash solution 150 is combined with the used wash solution 138a, cooled in the cooling unit 142, and returned to the absorber as part of the cooled used wash solution 144.

The temperature to which the used wash solutions 138a, 150 are cooled depends on several factors, including, but not limited to, the availability of cooling media, reaction kinetics of the wash solution and the contaminants present in the gas stream 120, and the characteristics of the packing material used in the absorption sections 132, 134. In one embodiment, the cooling unit 142 reduces the temperature of the used wash solutions 138a, 150 to a temperature of about 40 degrees Celsius (40° C.).

The cooled used wash solution 144 is introduced to the absorber 130 via the first introduction level 146 and flows downstream and passes through the bottom absorption section 134 where it contacts the gas stream 120. As the cooled used wash solution 144 contacts the gas stream 120, contaminants are absorbed from the gas stream before the wash solution is withdrawn at the first withdrawal level 139 as used wash solution 138. This process may be repeated.

The second portion of the used wash solution 138b that is withdrawn from the absorber 130 is provided to a regeneration system 160. The regeneration system 160 includes a regenerator 162 that is arranged to receive the used wash solution for the regeneration thereof. The used wash solution is provided to the regenerator 162 in at least three portions: used wash solution 141, a first heated used wash solution 164b and a second heated wash solution 166. The regenerator 162 may be, for example, a column, such as a packed bed column or a column containing trays. If a packed bed column, the regenerator 162 may include multiple sections having the same or different packing material.

The regenerator 162 removes, or absorbs, the gaseous contaminants from the used wash solution ("regenerates") to form a regenerated wash solution 168 and a contaminant stream 170. It is contemplated that the used wash solution 141, 164b, 166, is regenerated by stripping the gaseous contaminants by breaking the chemical bond between the contaminants and the wash solution.

The contaminant stream 170 may be subjected to further processing, such as condensation, or may be provided directly to a storage facility. In one embodiment, the used wash solution 141, 164b, 166 contains $CO_2$, which is removed from the wash solution in the regenerator 162 as a $CO_2$ gas stream 170, which is subsequently condensed and stored for later use.

As shown in FIG. 1, the used wash solution 138b from the absorber 130, is separated into two portions, with the first portion 141 provided directly to the regenerator 162 without heating or cooling the wash solution, while a second portion 143 is provided to a heat exchanger 172. Examples of heat-exchangers include, but are not limited to, shell-and-tube heat exchangers, and plate and frame heat exchangers.

In one embodiment, the used wash solution 138b is separated into two equal portions, e.g., 50% of the used wash solution 138b forms the first portion 141 provided to the regenerator 162, while 50% of the used wash solution 138b forms the second portion 143 provided to the heat exchanger 172. However, it is contemplated that in other embodiments the used wash solution 138b is separated into two unequal portions, e.g. 10% of the used wash solution 138b forms the first portion 141 provided to the regenerator 162 while 90% of the used wash solution forms the second portion 143 provided to the heat exchanger 172. In a particular embodiment, 1-10% of the used wash solution 138b forms the first portion 141 provided to the regenerator 162, with the remainder of the used wash solution 138b forming the second portion 143 that is provided to the heat exchanger 172.

The first portion 141 of the used wash solution provided to the regenerator 162 has a temperature (T1) that is the same or less than the temperature of the used wash solution 138 at the time it was withdrawn from the absorber 130. Typically, the temperature of the used wash solution 141 provided to the regenerator 162 is between 40 and 60 degrees Celsius.

The second portion 143 of the used wash solution provided to the heat exchanger 172 gains thermal energy and increases in temperature to form the first heated used wash solution 164. In one embodiment, as shown in FIG. 1, the first heated used wash solution 164 is separated into two portions 164a and 164b, with the first portion 164a provided to the regenerator 162 at an entry point downstream with respect to the flow of the used wash solution in the regenerator of where the used wash solution enters the regenerator 162. The second portion of the used wash solution 164b is provided to a separator 174.

In one embodiment, the first heated used wash solution 164 is separated into two equal portions, e.g., 50% of the first heated used wash solution 164 forms the first portion 164a provided to the regenerator 162, while 50% of the first heated used wash solution 164 forms the second portion 164b provided to the separator 174. However, it is contemplated that in other embodiments, the first heated used wash solution 164 is separated into two unequal portions, e.g., 10% of the first heated used wash solution 164 forms the first portion 164a provided to the regenerator 162 while 90% of the first heated used wash solution 164 the second portion 164b provided to the separator 174.

In a particular embodiment, 30-60% of the first heated used wash solution 164 forms the first portion 164a provided to the regenerator 162, with the remainder forming the second portion 164b that is provided to the separator 174.

The first heated used wash solution 164a provided to the regenerator 162 has a temperature (T2) that is greater than the temperature of the used wash solution 141 provided to the regenerator. Typically, the temperature (T2) of the first heated used wash solution 164a provided to the regenerator 162 is between 80 and 100 degrees Celsius.

The separator 174 removes the gaseous components (vapors) 176 from the second portion of the used wash solution 164b and provides the used wash solution to a heat exchanger 178. The gaseous components 176 are provided to the regenerator 162 at an entry point downstream with respect to where the first heated used wash solution 164a is provided to the regenerator. The used wash solution 164b provided to the heat exchanger 178 is heated therein to form a second heated used wash solution 166.

Figure 2:
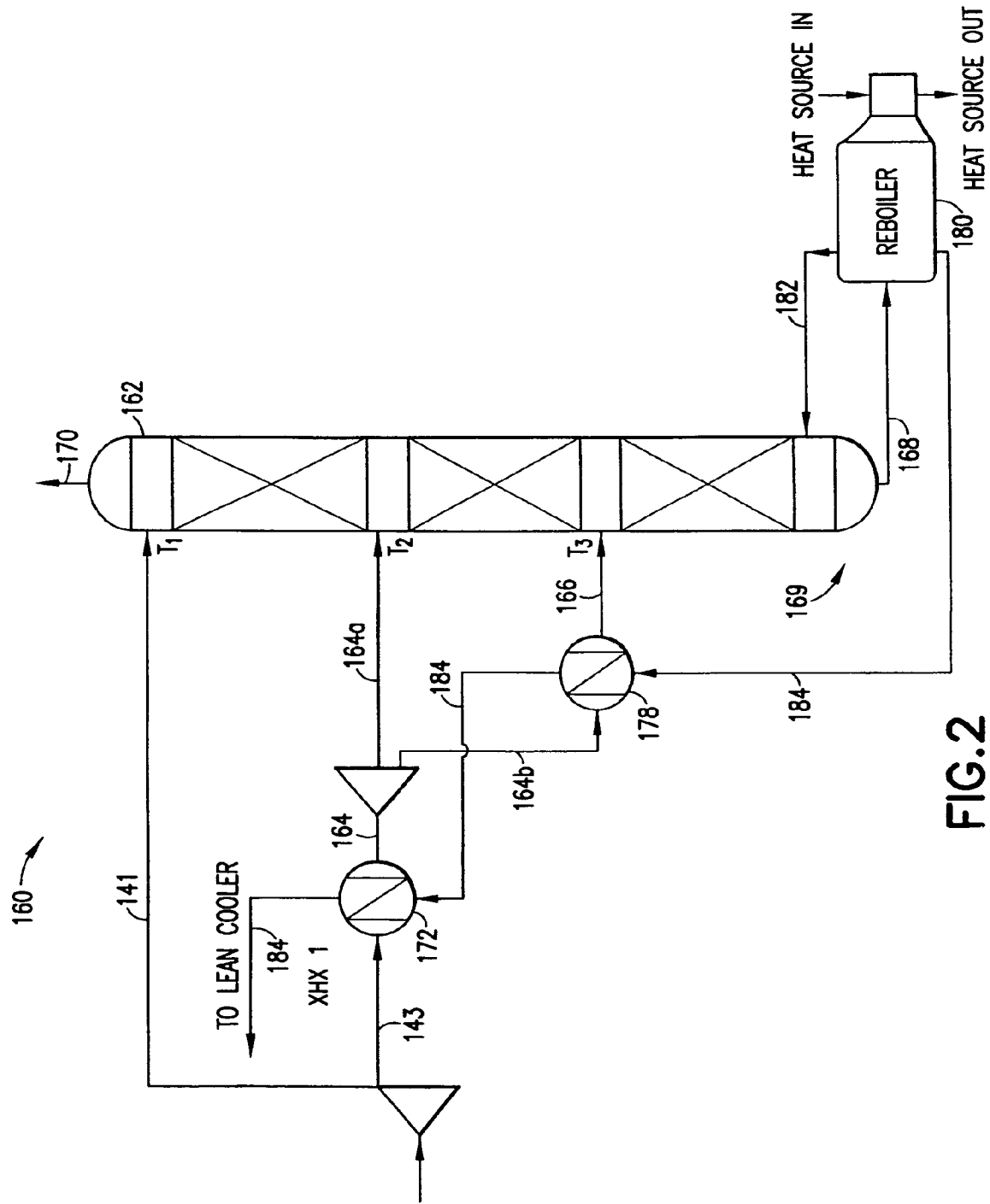
FIG. 2 is a schematic of a regenerator.

In another embodiment, as shown in FIG. 2, the first heated used wash solution 164 is separated into two portions 164a and 164b after leaving the heat exchanger 172. The first portion 164a is provided to the regenerator 162 at an entry point downstream of where the used wash solution 141 enters the regenerator and the second portion 164b is provided directly to the heat exchanger 178 where it is heated to form the second heated used wash solution 166. The arrangement in FIG. 2 does not include a separator 174 for removing gaseous components from the first heated used wash solution 164. In this embodiment, for ease of operation and for efficient thermal energy utilization, the outlet of the heat exchanger 178 may be heated to the point of vaporization, e.g., very close to the bubble point of the solution.

In FIG. 2, the first heated used wash solution 164 may be separated into two equal portions, e.g., 50% of the first heated used wash solution 164 forms the first portion 164a provided to the regenerator 162, while 50% of the first heated used wash solution 164 forms the second portion 164b provided to the heat exchanger 178. However, it is contemplated that in other embodiments the first heated used wash solution 164 is separated into two unequal portions, e.g., 10% of the first heated used wash solution 164 forms the first portion 164a provided to the regenerator 162 while 90% of the first heated used wash solution 164 the second portion 164b provided to the heat exchanger 178. In a particular embodiment, 30-60% of the first heated used solution 164 forms the first portion 164a provided to the regenerator 162, with the remainder forming the second portion 164b that is provided to the heat exchanger 178.

Referring now to both FIGS. 1 and 2, the temperature of the first heated used wash solution 164b is increased in the heat exchanger 178, thereby forming the second heated used wash solution 166. The second heated used wash solution 166 is provided to the regenerator 162. The temperature (T3) of the second heated wash solution 166 that is provided to the regenerator 162 is greater than the temperature (T2) of the first heated used wash solution 164a provided to the regenerator. The temperature of the second heated used wash solution 166 (T3) is also greater than the temperature of the used wash solution 141 (T1) provided to the regenerator 162. In one embodiment, the temperature (T3) of the second heated used wash solution 166 is between 110 and 150 degrees Celsius. The temperature distribution of the used wash solutions 141, 164a, 166 that are provided to the regenerator 162 is $T1<T2<T3$.

The second heated used wash solution 166 is provided to the regenerator 162 at an entry point downstream of where the first heated used wash solution 164a and the used wash solution 141 are introduced.

As shown in FIGS. 1 and 2, the temperature (T3) of the second heated used wash solution 166 provided to the regenerator 162 is greater than the temperature (T2) of the first heated used wash solution 164a provided to the regenerator, and the temperature of the first heated used wash solution provided to the regenerator is greater than the temperature (T1) of the used wash solution 141 provided to the regenerator (T1<T2<T3). Maintaining the temperature distribution of the used wash solutions 141, 164a, 166 enables maximum utilization of thermal energy in the regenerator 162 by simultaneously minimizing the loss of energy required to strip the contaminants away from the wash solution (the "stripping energy"). Maximum utilization of the thermal energy thus reduces the energy consumption of the regenerator 162.

The regeneration energy required to run a conventional solvent-based gaseous contaminant capture process is distributed in different forms: (1) the energy required heating the wash solution to initiate a regeneration reaction ("sensible heat"); and (2) the steam energy required to remove the contaminants from the wash solution, i.e., solvent ("stripping energy").

The theoretical minimum amount of energy needed to remove the contaminants from the solvent is set to the binding energy of the solvent. However, the energy spent on stripping the contaminants can be minimized by effective thermal energy utilization. The temperature distribution along the regenerator 162 is such that the temperature is the highest at the bottom, where regeneration is enhanced. Having a temperature distribution that satisfies the following formula: used wash solution (T1)<first heated used wash solution (T2)<second heated used wash solution (T3), facilitates the minimization of stripping energy.

The used wash solution 141, the first heated used wash solution 164a and the second heated used wash solution 166 are regenerated in the regenerator, as discussed above, to form the regenerated wash solution 168. The regenerated wash solution 168 is withdrawn from a bottom portion 169 of the regenerator 162 and provided to a reboiler 180, which is positioned downstream of the regenerator (with respect to the flow of the wash solution) and arranged to receive the regenerated wash solution.

The reboiler 180 boils the regenerated wash solution 168 to form a steam 182 and a hot regenerated wash solution 184. The steam 182 is provided to the regenerator 162 to facilitate the removal of contaminants from the used wash solution 141, 164a, 166 present in the regenerator. The hot regenerated wash solution 184, also referred to as "hot lean solution," is provided to the absorber 130 for removal of gaseous contaminants from the gas stream 120.

The hot regenerated wash solution 184 may be provided directly to the absorber 130 for re-use. However, to take advantage of the thermal energy present in the hot regenerated wash solution 184, as shown in FIGS. 1 and 2, the hot regenerated wash solution is provided to the heat exchanger 178, where it exchanges heat with the used wash solution 164b. Accordingly, after passing through the heat exchanger 178, the hot regenerated wash solution 184 has a decreased temperature as compared to the temperature after leaving the reboiler 180.

In one embodiment, the hot regenerated wash solution 184 has a temperature between about 100 and 140 degrees Celsius after passing through the heat exchanger 178. Heating the used wash solution 164b with the hot regenerated wash solution 184 eliminates the need for a separate heating medium provided to the heat exchanger 178, thereby reducing costs and energy consumption of the system 100.

After passing through the heat exchanger 178, the hot regenerated wash solution 184 is provided to the heat exchanger 172, where it exchanges heat with the used wash solution 143 to form the first heated used wash solution 164. Accordingly, after passing through the heat exchanger 172, the hot regenerated wash solution 184 has a decreased temperature as compared to the temperature after leaving the heat exchanger 178. In one embodiment, the hot regenerated wash solution 184 has a temperature between about 80 and 120 degrees Celsius after passing through the heat exchanger 172.

Heating the used wash solution 143 by exchanging heat with the hot regenerated wash solution 184 eliminates a separate heating medium for the heat exchanger 172, thereby reducing cost and energy consumption of the system 100. This enables utilizing thermal energy from the hot regenerated wash solution 184 as sensible heat in the regeneration process.

After passing through the heat exchanger 172, the hot regenerated wash solution 184 is provided to a cooling unit 186. The cooling unit 186 is disposed between the heat exchanger 172 and the absorber 130 and is arranged to receive the hot regenerated wash solution 184 and cool the temperature of the same to form a cooled regenerated wash solution 188. The cooled regenerated wash solution 188 has a temperature of between about 25 and 50 degrees Celsius.

The cooled regenerated wash solution 188 is provided to the absorber 130 at an entry point via line 136. The entry point of the cooled regenerated wash solution 188 is located at the top portion 135 of the absorber 130. The cooled regenerated wash solution 188 is contacted with the gas stream 120 to remove gaseous contaminants therefrom, thereby repeating the cycle of absorption and regeneration.

By utilizing the thermal energy in the hot regenerated wash solution 184 and maintaining the above-mentioned temperature distribution in the regenerator, the overall energy consumption of the system 100 may be decreased as compared to conventional systems.

EXAMPLES

Example 1

Figure 3:
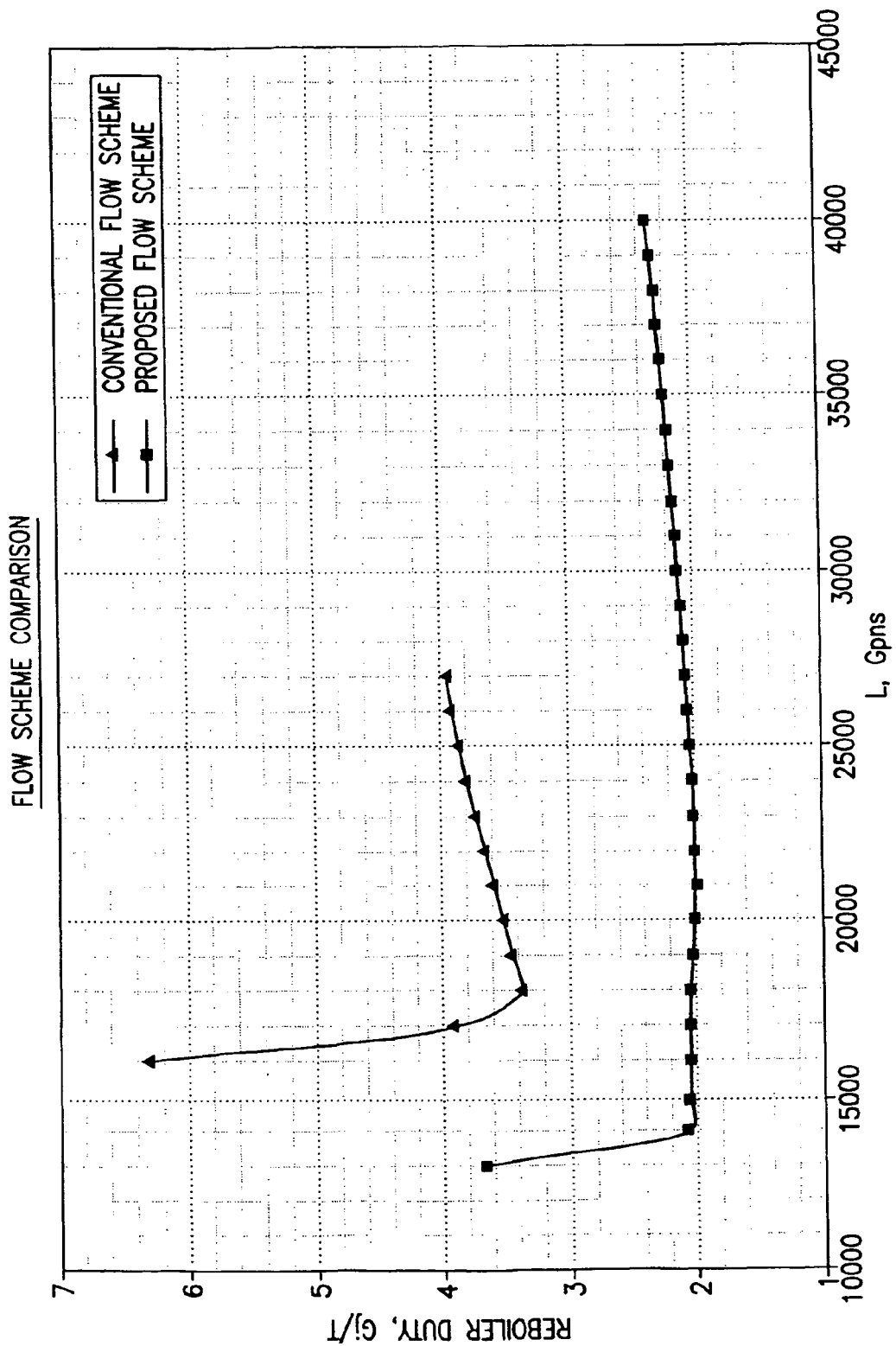
FIG. 3 is a graph presenting data related to a simulated test of the system described herein.

To determine the energy consumption of a system according to the description herein, a system simulating the schematic illustrated in FIG. 1 was employed. The simulation had a 90% $CO_2$ removal from a flue gas operating with about 13-14 mole. % inlet $CO_2$. As compared to a conventional system, the system described herein utilizes 30-40% less energy. The results of the simulation are shown in FIG. 3.

Unless otherwise specified, all ranges disclosed herein are inclusive and combinable at the end points and all intermediate points therein. The terms "first," "second," and the like, herein do not denote any order, quantity, or importance, but rather are used to distinguish one element from another. The terms "a" and "an" herein do not denote a limitation of quantity, but rather denote the presence of at least one of the referenced item. All numerals modified by "about" are inclusive of the precise numeric value unless otherwise specified.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for regenerating a wash solution utilized to remove gaseous contaminants from a gas stream, the system comprising:
 a regenerator;
 a first portion of a used wash solution provided to the regenerator at a first location;
 a first heat exchanger for heat transfer between a regenerated wash solution and a second portion of the used wash solution to form a first portion of a first heated used wash solution, wherein the first portion of the first heated used wash solution is provided at a second location;
 a second heat exchanger for heat transfer between the regenerated wash solution and a second portion of the first heated used wash solution to form a second heated used wash solution, wherein the second heated used wash solution is provided to the regenerator at a third location; and
 wherein the second heated used wash solution has a temperature greater than the first portion of the first heated used wash solution and the first portion of the first heated used wash solution has a temperature greater than the first portion of the used wash solution.

2. The system according to claim 1, further comprising:
 a reboiler arranged to heat the regenerated wash solution and form steam.

3. The system according to claim 1, further comprising:
 an absorber arranged to receive the gas stream comprising gaseous contaminants.

4. The system according to claim 3, further comprising:
 a first cooler arranged to receive the regenerated wash solution from the first heat exchanger and cooling the same to form a cooled regenerated wash solution.

5. The system according to claim 4, wherein the absorber is arranged to receive the cooled regenerated wash solution.

6. The system according to claim 3, further comprising:
 a second cooling unit in fluid communication with the absorber, wherein the second cooling unit receives used wash solution from a first withdrawal level of the absorber and returns a cooled used wash solution to a first reintroduction level of the absorber, wherein the first reintroduction level is upstream of the first withdrawal level with respect to a flow of the wash solution in the absorber.

7. The system according to claim 6, wherein the absorber further comprises:
 a second withdrawal level for providing used wash solution to the second cooling unit, wherein the second withdrawal level is upstream of the first withdrawal level, with respect to the flow of the wash solution in the absorber.

8. The system according to claim 3, wherein the absorber is a packed bed column.

9. The system according to claim 8, wherein the packed bed column comprises multiple absorption sections of similar packing.

10. The system according to claim 8, wherein the packed bed column comprises multiple absorption sections of different packing.

11. A process for regenerating a wash solution utilized in removing gaseous contaminants from a gas stream, the process comprising:
 providing a first portion of a used wash solution to a regenerator at a first location;
 providing a second portion of the used wash solution to a first heat exchanger to transfer heat between a regenerated wash solution and the second portion of the used wash solution to form a first heated used wash solution;
 providing a first portion of the first heated used wash solution to the regenerator at a second location;
 providing a second portion of the first heated used wash solution to a second heat exchanger for heat transfer between the regenerated wash solution and the second portion of the first heated used wash solution to form a second heated used wash solution; and
 providing the second heated used wash solution to the regenerator at a third location, wherein the second heated used wash solution has a temperature greater than a temperature of the first portion of the first heated used wash solution, and the first portion of the first heated used wash solution has a temperature greater than a temperature of the first portion of the used wash solution.

12. The process according to claim 11, further comprising:
 contacting the first portion of the used wash solution, the first heated used wash solution and the second heated used wash solution with steam in the regenerator to form a regenerated wash solution.

13. The process according to claim 12, further comprising:
 heating the regenerated wash solution in a reboiler, thereby forming a hot regenerated wash solution.

14. The process according to claim 13, further comprising:
 providing the regenerated wash solution to a cooling unit to form a cooled regenerated wash solution, the cooling unit positioned between the first heat exchanger and an absorber.

15. The process according to claim 14, further comprising:
 providing the cooled regenerated wash solution to the absorber; and
 contacting the cooled regenerated wash solution with a gas stream comprising gaseous contaminants, thereby removing the gaseous contaminants from the gas stream and forming the used wash solution.

16. The process according to claim 11, further comprising:
 maintaining a temperature distribution of the used wash solution, the first heated used wash solution and the second heated used wash solution such that the second heated used wash solution has a temperature greater than the temperature of the first heated used wash solution and the first heated used wash solution has a temperature greater than the temperature of the used wash solution, the temperature distribution effective to reduce an amount of energy consumed by the regenerator.

17. The system according to claim 1, wherein the regenerator is a packed bed column.

18. The system according to claim 17, wherein the packed bed column comprises multiple absorption sections of similar packing.

19. The system according to claim 17, wherein the packed bed column comprises multiple absorption sections of different packing.

20. The system according to claim 1, wherein, in relation to the direction of the used wash solution through the regenerator, the first location is disposed upstream of the second location and the second location is upstream of the third location.

21. The system according to claim 1, further includes a separator that separates the gaseous portion from the second heated used wash solution, wherein the gaseous portion is provided to the regenerator at a fourth location.

22. The system according to claim 21, wherein, in relation to the direction of the used wash solution through the regenerator, the first location is disposed upstream of the second location, the second location is upstream of the third location, and the fourth location is disposed between the second and third location.

23. The process according to claim 11, wherein, in relation to the direction of the used wash solution through the regenerator, the first location is disposed upstream of the second location and the second location is upstream of the third location.

24. The process according to claim 11, further comprising:
separating the gaseous portion from the second heated used wash solution, and
providing the gaseous portion to the regenerator at a fourth location.

25. The process according to claim 24, wherein, in relation to the direction of the used wash solution through the regenerator, the first location is disposed upstream of the second location, the second location is upstream of the third location, and the fourth location is disposed between the second and third location.

26. The system according to claim 1, wherein the first portion of the used wash solution is approximately equal to the second portion of the used wash solution.

27. The system according to claim 1, wherein the first heated wash solution is approximately equal to the second heated used wash solution.

28. The system according to claim 1, wherein the first portion of the used wash solution is approximately 10-90% of the second portion of the used wash solution and the second heated used wash solution is approximately 10-90% of the second portion of the used wash solution.

29. The system according to claim 1, wherein the first heated wash solution is approximately 10-90% of the second portion of the used wash solution and the second heated used wash solution is approximately 10-90% of the second portion of the used wash solution.

* * * * *